(12) United States Patent
Lai et al.

(10) Patent No.: US 10,651,885 B2
(45) Date of Patent: May 12, 2020

(54) PIM COMPENSATION AT A TRANSMITTER'S RADIO FREQUENCY PORT

(71) Applicant: Telefonaktiebolaget LM Ericsson (publ), Stockholm (SE)

(72) Inventors: Xiaoming Lai, Ottawa (CA); Renyuan Li, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/335,596

(22) PCT Filed: Sep. 21, 2016

(86) PCT No.: PCT/IB2016/055641
§ 371 (c)(1),
(2) Date: Mar. 21, 2019

(87) PCT Pub. No.: WO2018/055435
PCT Pub. Date: Mar. 29, 2018

(65) Prior Publication Data
US 2019/0363750 A1 Nov. 28, 2019

(51) Int. Cl.
*H04B 1/525* (2015.01)
*H04B 1/04* (2006.01)
*H04B 1/12* (2006.01)

(52) U.S. Cl.
CPC .......... *H04B 1/525* (2013.01); *H04B 1/0475* (2013.01); *H04B 1/123* (2013.01)

(58) Field of Classification Search
CPC ...... H04B 1/525; H04B 1/0475; H04B 1/123; H04B 1/10; H04B 1/1027; H04B 1/7107; H04B 15/00; H04B 2215/00; H04W 40/16
See application file for complete search history.

(56) References Cited

U.S. PATENT DOCUMENTS

| | | | |
|---|---|---|---|
| 2014/0036969 A1* | 2/2014 | Wyville | H04B 1/38 375/219 |
| 2014/0161005 A1* | 6/2014 | Laurent-Michel | H04B 1/525 370/281 |
| 2015/0349819 A1* | 12/2015 | Meng | H03F 1/32 370/276 |

(Continued)

FOREIGN PATENT DOCUMENTS

WO 2009082084 A1 7/2009

OTHER PUBLICATIONS

Henrie J et al., "Cancellation of Passive Intermodulation Distortion in Microwave Networks", Proceedings of the 38th European Microwave Conference, Piscataway NJ, USA, Oct. 27, 2008, pp. 1153-1156.

(Continued)

*Primary Examiner* — Siu M Lee
(74) *Attorney, Agent, or Firm* — Sage Patent Group (57) ABSTRACT

A wireless communication device is provided. The wireless communication device comprises a transceiver; an antenna connected to the transceiver through a transmission path; and a compensation circuit configured to or operative to compensate for a passive intermodulation (PIM) interference on the transmission path, the compensation circuit generating a PIM estimate signal based on a transmit signal and a PIM error signal.

19 Claims, 9 Drawing Sheets

(56) References Cited

U.S. PATENT DOCUMENTS

2017/0141807 A1* 5/2017 Chen ...................... H04B 1/123
2017/0302390 A1* 10/2017 Entsfellner .............. H04B 3/46
2019/0104457 A1* 4/2019 Lindoff ............... H04W 72/082

OTHER PUBLICATIONS

International Search Report and Written Opinion for PCT/IB2016/055641 dated May 11, 2017, 10 pages.
International Preliminary Report on Patentability for PCT/IB32016/055641 dated Mar. 26, 2019, 7 pages.

* cited by examiner

PIM COMPENSATION AT A TRANSMITTER'S RADIO FREQUENCY PORT

TECHNICAL FIELD

This disclosure relates generally to methods and wireless communication devices for cancelling or compensating for Passive InterModulation (PIM) at a transmitter's Radio Frequency (RF) port in the wireless communications devices.

BACKGROUND

Passive Intermodulation (PIM) occurs when signals are present in a passive device that exhibits some non-linear behavior. In a wireless communication device, such as a base station in a wireless communication network, PIM occurs when a high power transmit signal is passed through a passive device that exhibits some non-linearity. This non-linear passive device is referred to as a PIM source. The PIM source may be a non-linear component in a transmit path of the wireless communication device such as, for example, a cable, a connector, a duplex filter, an antenna of the wireless communication device, or even rusty bolt and the like. The PIM source may alternatively be due to an object that is external to the wireless communication device (e.g., a fence). The wireless communication device may have multiple PIM sources.

The PIM created by a PIM source includes multiple Intermodulation Products (IMPs) (e.g., 2nd order, 3rd order, etc.) of the transmit signal. The PIM degrades the wanted signal, in terms of quality and purity. When any of the IMPs fall within a passband of a receiver of the wireless communication device, a resulting PIM distortion is introduced into the received signal and, as a result, the receiver is desensitized. When the receiver's is desensitized, its performances and data-throughput degrade.

PIM distortion is particularly problematic for multi-carrier or multi-band wireless communication devices, such as the new generation of high-power wideband (WB) multi-RAT and multiband wireless communication base stations. Multi-carrier or multi-band signals are an important characteristic of modern wireless communication standards (e.g., the Long Term Evolution (LTE) cellular communication standard) as well as multi-standard, or multi-band, wireless communication devices.

Furthermore, PIM may result in high level of electromagnetic wave emissions, which may exceed the regulatory limit of emissions for radio systems. As such, the radio systems may fail to meet the regulations regarding the emissions. Also, the emissions could cause interference to other radio systems that are co-located at the same site. They may interfere with other UpLink (UL) links of a same radio system, which has diversity at the receiver (Rx) or with Multi Input Multi Output (MIMO) operation.

As such, PIM distortion and emission are becoming an increasingly important problem that needs to be addressed.

SUMMARY

According to a first aspect of the invention, there is provided a method for providing a wireless communication device. The wireless communication comprises a transceiver; an antenna connected to the transceiver through a transmission path; and a compensation circuit operative to compensate for a passive intermodulation (PIM) interference on the transmission path, the compensation circuit generating a PIM estimate signal based on a transmit signal and a PIM error signal.

According to a second aspect of the invention, there is provided a method for compensating Passive InterModulation (PIM) in a wireless communication device, which includes a transceiver and an antenna connected to the transceiver through a transmission path. The method comprises generating a PIM estimate signal based on a transmit signal and a PIM error signal; and compensating a PIM interference on the transmission path using the PIM estimate signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Current techniques cancel the PIM products that fall in the frequency band of the receiver. As such, they improve the UL data throughput of the radio systems. However, they don't address the PIM emission level at the RF antenna port. In scenarios where the PIM emission level is high, these techniques are unable to solve the following problems: 1) The PIM emissions may fall into other RF antenna ports that share the same UL band, e.g. for MIMO operation or Receive (Rx) diversity, and as a result they cause interference to the other Rx branches of a wireless communication device, such as a base station; 2) The PIM emissions may fall into co-located wireless communication devices with a different UL bands and cause interference to the other band operations; 3) These techniques are only applicable for FDD radio communication systems.

Another approach for cancelling the PIM products is to add an engineered PIM source, also referred to as a non-linear passive interposer, into a wireless communication device's transmit path. This engineered PIM source is designed to statically compensate for PIM generated by specific types of passive devices. This approach, however, is problematic because the engineered source cannot dynamically track and compensate for the PIM interference, which varies over time and from device to device.

Generally stated, embodiments of the present invention provide for a PIM cancellation technique that cancels the PIM products dynamically and adaptively on the Radio Frequency (RF) transmission path, in both Frequency Division Duplex (FDD) and Time Division Duplex (TDD) systems. The PIM cancellation is performed at the RF antenna port, such that the PIM products generated at the RF transmission path are cancelled in the RF domain and the emission level due to the PIM is reduced.

It should be noted that a RF antenna port is defined as a RF interface of the wireless communication device to the antenna. In a radio base-station, the RF antenna port is connected to an antenna to send the transmit (Tx) signal out into the air and the radio base-station also gets the UL RF signal from the antenna via the RF antenna port.

A wireless radio system usually consists of a transmitter and a receiver, a duplexer/filter, a feeder cable and an antenna. When a radio communication system is transmitting a multiple carrier RF signal, the transmitter and Power Amplifier (PA) will boost the signal to a higher power level. When this high power multicarrier signal passes through some passive components in the RF transmission path, e.g. a duplexer, RF connectors, an antenna and certain metal objects around the antenna, the signal will interact with these passive components. The carriers will modulate with each other and create intermodulation products. These are called PIM products. The PIM products have many different elements and spread over the frequency spectrum.

Figure 1:
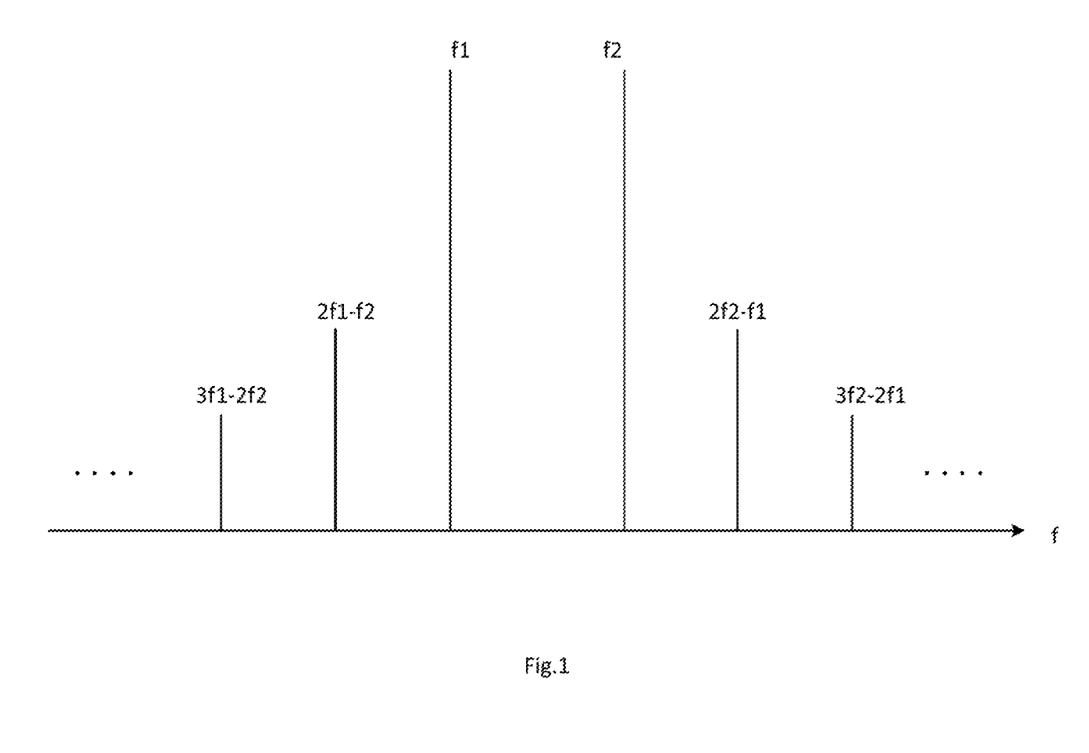
FIG. 1 illustrates a frequency spectrum that illustrates PIM interference resulting from transmission of a two tone RF signal through a passive component.

For example, as illustrated in FIG. 1, in a scenario where there are 2 carriers, with carrier 1 being located at frequency f1 and carrier 2 being located at f2, the PIM products generated by the passive components could be located at frequencies $\pm m*f1 \pm n*f2$, where m, n=0, 1, 2, 3 . . . . Even though there could be a number of PIM product elements created by the passive components, usually, only some of them are causing emission problems in practice.

For example, $\pm 2f1 \pm f2$, $\pm f1 \pm 2f2$ are the third order mixing products. Among the 3rd order mixing products, only $2f1-f2$ and $-f1+2f2$ are usually of concern because they are close to the frequencies f1 and f2 of the wanted signals (as shown in FIG. 1) and have powers higher than that of the other orders of mixing products.

Similarly, $3f1-2f2$, $-2f1+3f2$ could be of concern among the many 5th order mixing products.

Therefore, PIM cancellation techniques are targeted at these PIM elements that cause the emission problem, e.g. $2f1-f2$, $2f2-f1$, $3f2-2f1$, $3f1-2f2$.

Now, turning to FIG. 2, a wireless communication device 100, according to an embodiment, will be described. The wireless communication device 100 could be a base station, an eNode B (eNB), or any other node/device in a wireless communication network that transmits a signal through passive devices, at a relatively high transmit power, for example.

The wireless communication device 100 may comprise a transceiver 110, a duplexer/filter 220, an antenna 120 and a PIM compensation circuit 130. As such, the wireless communication device 100 is configured to transmit and receive signals through the respective transmit and receive paths of the transceiver 110.

Figure 2:
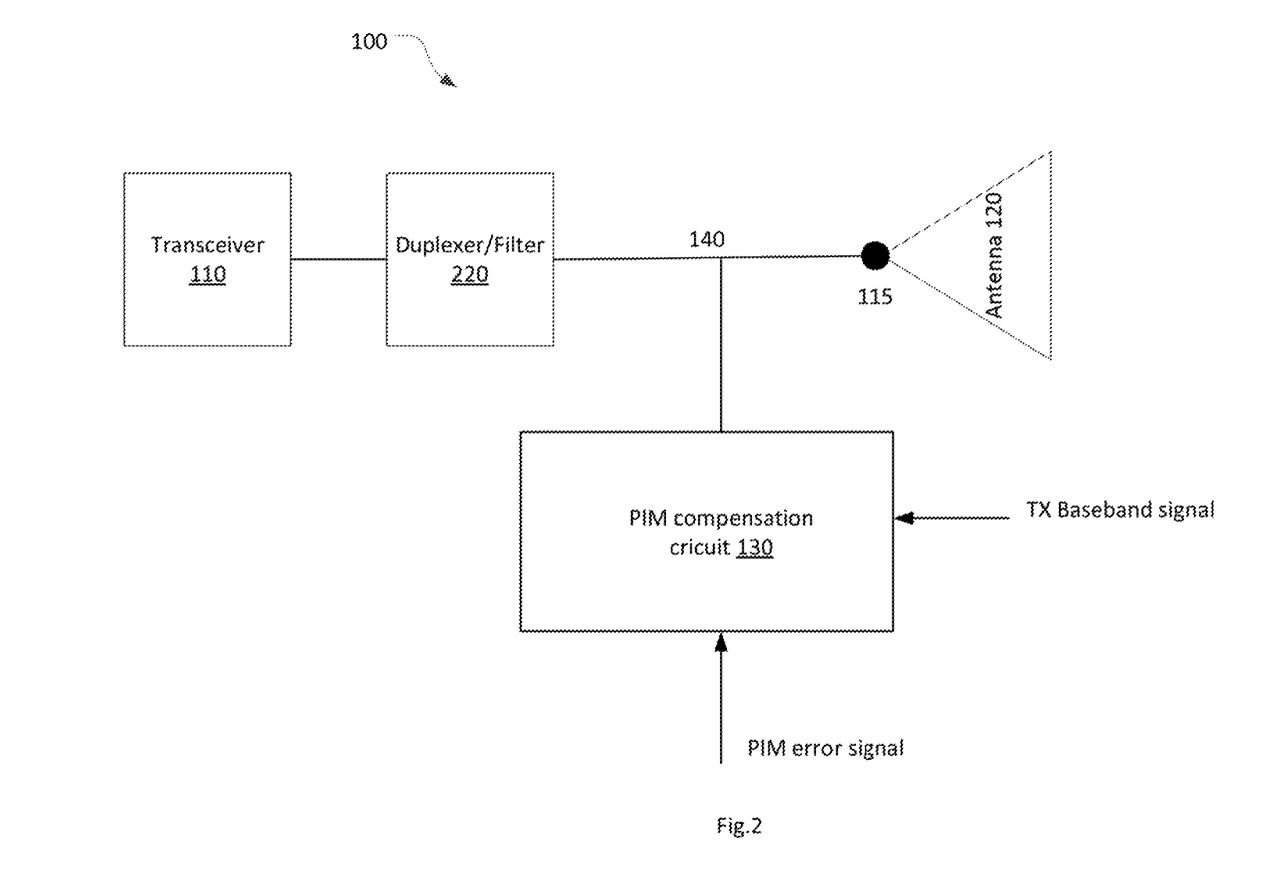
FIG. 2 illustrates a schematic block diagram of a wireless communication device according to an embodiment.

The transceiver 110 comprises a transmitter and a receiver for example (not shown in FIG. 2). The transceiver 110 is connected to the antenna 120 through a transmission path 140, which may include a duplexer or a filter 220. A RF antenna port 115 can be defined on the transmission path 140, as the interface between the antenna 120 and the transceiver 110. When a signal is transmitted through the transmitter 110, the duplexer (or the filter) 220 and other passive components (e.g. cable, connector, etc. (not shown)) disposed on the transmission path 140 generate PIM that is propagated into the transmission path 140 as interference. Additionally, the antenna 120 itself can also generate the PIM interference on the transmission path 140.

The PIM compensation circuit 130 is configured or operative to dynamically compensate for the generated PIM interference on the transmission path 140. The PIM compensation circuit 130 is configured to generate a PIM estimate signal based on a transmit (Tx) signal, e.g. a Tx baseband signal, and a PIM error signal. For example, the PIM estimate signal has the same amplitude but opposite phase as the PIM interference of the RF signal on the transmission path 140. As such, the generated PIM products or PIM interference can be compensated/cancelled on the transmission path 140. Since the PIM estimate signal is based on the Tx baseband signal, from which the PIM interference is originally generated in the passive components, the PIM compensation circuit 130 can effectively emulate and reproduce the PIM interference. Also, the PIM estimate signal is adjusted based on the PIM error signal, which is a residual error from the PIM compensation operation. As such, the estimation of the PIM interference can be improved and optimized with this feedback information, as the PIM interference changes over time due to the variations of the passive components.

Figure 3:
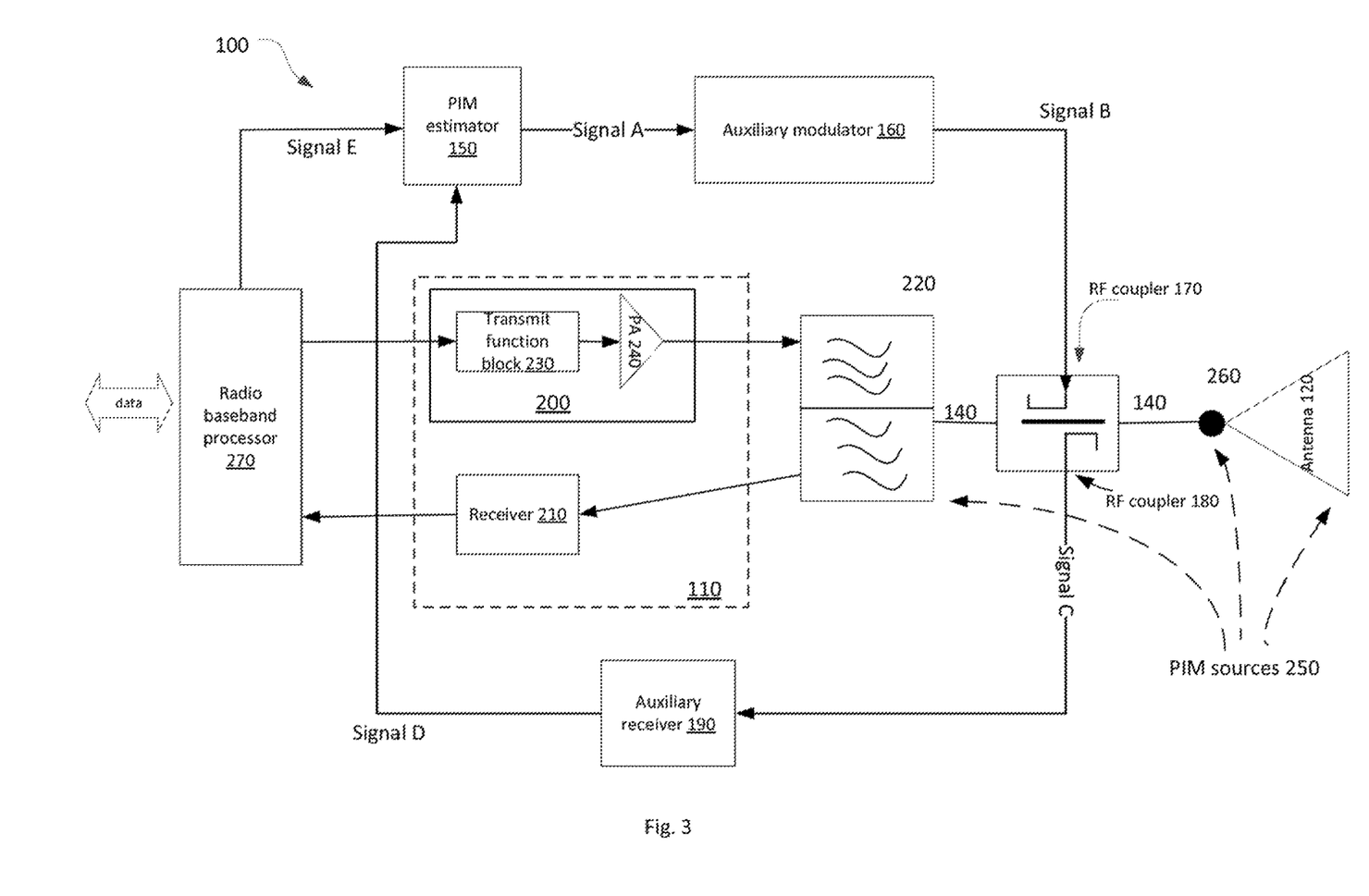
FIG. 3 illustrates a detailed example of the wireless communication node of FIG. 3.

FIG. 3 illustrates in more detail the wireless communication device 100 of FIG. 2.

The transceiver 110 comprises a transmitter 200 and a receiver 210. The transmitter 200 is used to send signals in the downlink, for example, from a base station to a wireless device, such as a User Equipment (UE). The receiver 210 is used to receive signals in the uplink, for example, from the wireless device to the base station.

The wireless communication device 100 also comprises a duplexer 220, for isolating the receiver 210 from the transmitter 200, while permitting them to share a common antenna 120.

The duplexer 220 is connected to the antenna 120, from which RF signals are received or sent.

The transmitter 200 may comprise a transmitter function block 230 and a power amplifier 240.

These elements are well-known in the art and will not be described further.

Furthermore, FIG. 3 shows different possible PIM sources 250 on the transmission path 140, such as the duplexer 220, a connector 260 at the antenna 120 and the antenna 120. The connector 260 could represent a RF antenna port. Other sources of PIM are possible, such as a cable, etc., which are not illustrated in FIG. 3.

The PIM compensation circuit 130, also referred simply to as the compensation circuit 130, comprises a PIM estimator 150, an auxiliary modulator or modulator 160, a first RF coupler 170, a second RF coupler 180 and an auxiliary receiver 190, according to an embodiment.

The PIM estimator 150 is configured to generate a signal A that emulates the PIM interference generated by the PIM sources 250, based on a radio Transmit (Tx) baseband signal (signal E), provided by a radio baseband processor 270, which is a digital processor that processes Tx and Rx baseband signals, for example. In other words, the PIM estimator 150 generates a PIM estimate signal that has the same amplitude but opposite phase as the PIM interference (or PIM products) in the RF signal from the transmission path 140. The output of the PIM estimator 150 represents the PIM estimate signal (signal A). The PIM estimator 150 is connected to the auxiliary modulator 160. An example implementation of the PIM estimator 150 is given in FIG. 6. It should be noted that the PIM estimator 150 also takes as input a PIM error signal, which will be described herein below.

Figure 8:
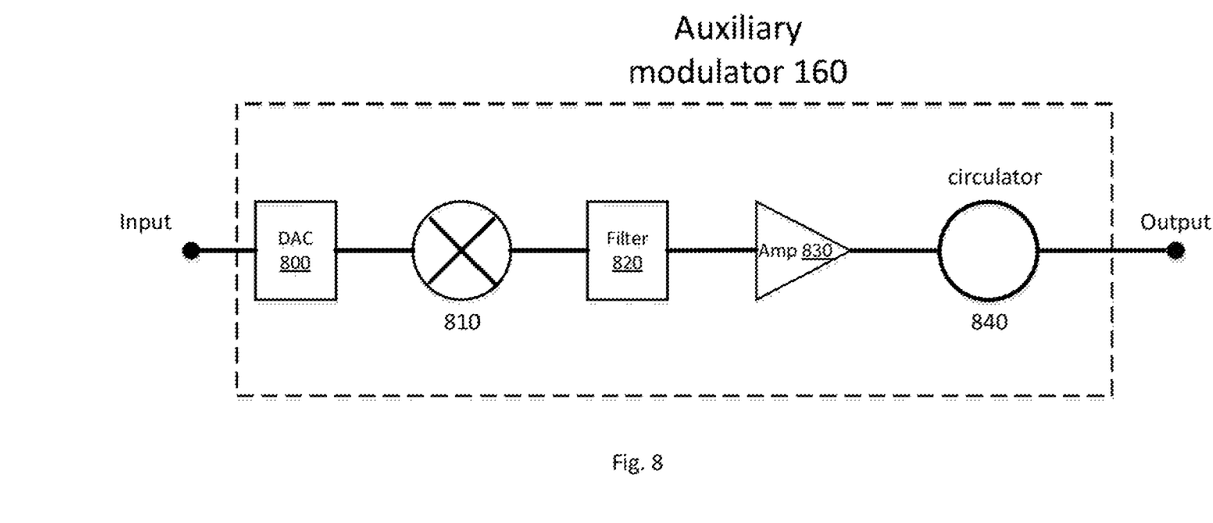
FIG. 8 illustrates a schematic diagram of an auxiliary modulator.

The auxiliary modulator 160 is configured to generate a signal B, which is a modulated PIM estimate signal. To do so, it takes as input signal A coming from the PIM estimator 150; it modulates signal A, which is the PIM estimate signal, to frequencies corresponding to the PIM interference, to generate the modulated PIM estimate signal. In other words, the modulator 160 converts signal A to be at specific RF frequencies where the PIM products are located, through modulation. Therefore, signal B is the PIM estimate signal at the frequencies corresponding to the PIM products. The corresponding frequencies are the inter-modulation of the RF signal and easily identified as being multiple combination of the main frequencies of the RF signal (see FIG. 1). Furthermore, the modulator 160 is connected to the first RF coupler 170. An exemplary implementation of the modulator 160 is illustrated in FIG. 8.

The first RF coupler 170 is configured to compensate for the PIM interference on the transmission path 140. To do so, it couples the modulated PIM estimate signal (i.e. signal B) to a RF signal from the transmission path 140. As an example, the RF signal can come from the antenna 120. In other words, the RF coupler 170 feeds signal B to the RF transmission path 140. Since the modulated PIM estimate signal B has opposite phases but same amplitude as the actual PIM products of the RF signal from the transmission path 140, when coupled with each other, the PIM products of the RF signal are cancelled/compensated. In order to differentiate the RF signal referred to in this paragraph from other RF signals, this RF signal could be referred to as the first RF signal.

The second RF coupler 180 is located on the transmission path 140 and is configured to couple a second RF signal, such as signal C, from the transmission path 140, for example, near the RF antenna port 260. It should be noted that signal C has been PIM compensated.

Figure 9:
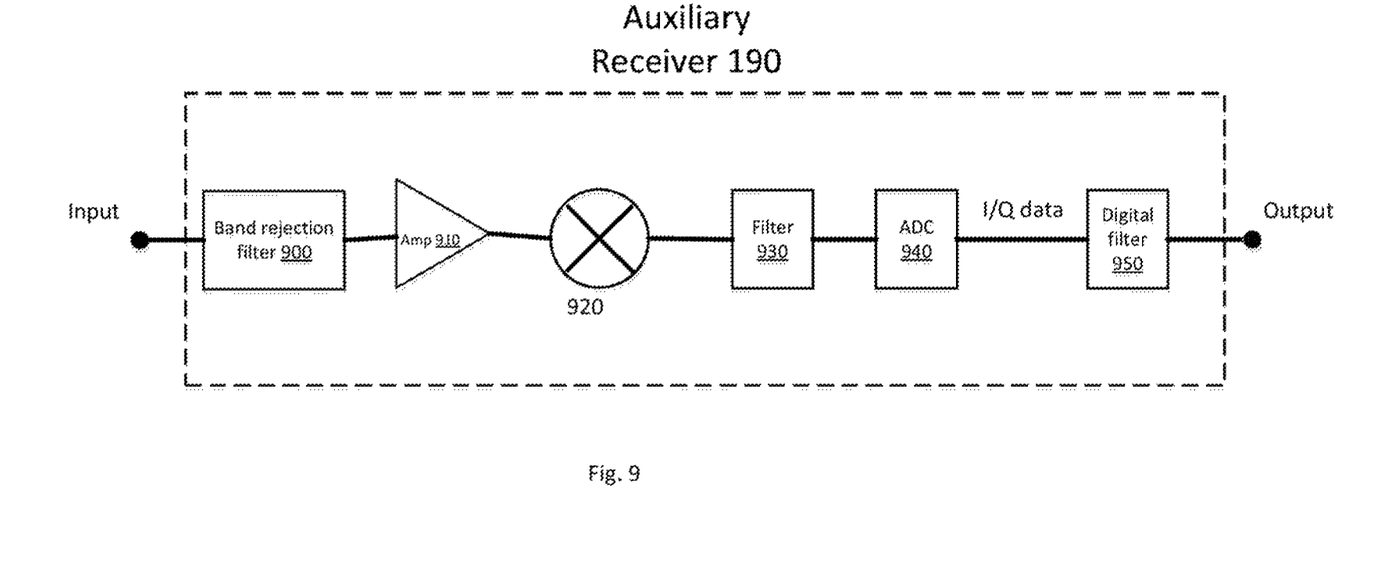
FIG. 9 illustrates a schematic diagram of an auxiliary receiver.

The auxiliary receiver (or receiver) 190 is connected to the second RF coupler 180 and is configured to determine the PIM error signal from the second RF signal. To do so, the receiver 190 is tuned to the frequencies of the PIM products or interference and as such it can determine or detect a PIM residual error (signal D). The PIM error signal (or signal D) is the difference between the PIM estimate signal and the PIM products of the RF signal. The error signal is zero if the PIM estimate signal has been perfectly estimated, i.e. the PIM estimate signal is equal to the PIM products. If the PIM estimate signal is not perfectly estimated, then there will be a non-null error signal, which will be detected by the auxiliary receiver 190. More specifically, the auxiliary receiver 190 first down-converts each of the PIM products in the signal C and then demodulates them to recover the residual error signal D. The residual signal D is then sent to the PIM estimator 150 to optimize the PIM estimation; as such, a feedback optimization loop is formed. For example, the residual signal D can be used to re-adjust the coefficients of an adaptive filter in the PIM estimator 150 in order to form a feedback loop circuit of the PIM cancellation and improve the estimation of the PIM distortion/interference. An exemplary implementation of the auxiliary receiver 190 is shown in FIG. 9.

It should be noted that the wireless communication device of FIG. 3, comprising the compensation unit 130, is for use in a Frequency Division Duplex (FDD) radio communication system.

Figure 4:
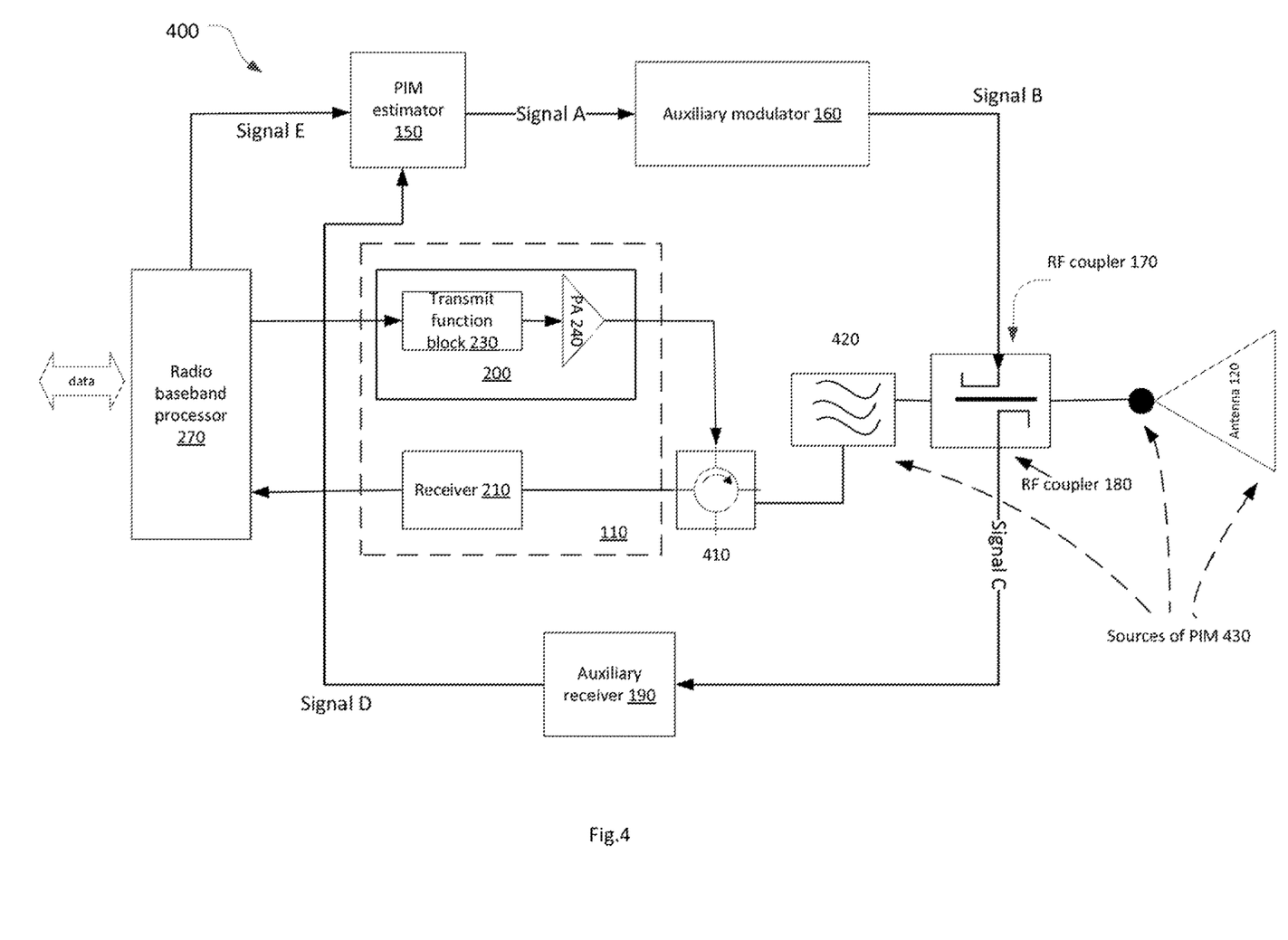
FIG. 4 illustrates a wireless communication device according to an embodiment, for use in a Time Division Duplex (TDD) radio communication system.

FIG. 4 illustrates a wireless communication device 400 used in a Time Division Duplex (TDD) radio communication system, with the PIM compensation circuit 130, as described above (i.e. in FIG. 3), to cancel the out-of-band emissions caused by the PIM sources 430.

The compensation circuit 130 works the same way as described above (i.e. FIG. 3), with the same elements, such as the PIM estimator 150, the auxiliary modulator 160, the first RF coupler 170, the second coupler 180, and the auxiliary receiver 190. In the TDD radio communication system, the transmission path 140 of the wireless communication device 400 may comprise components such as a circulator 410 and a filter 420 between the transceiver 110 and the antenna 120.

The circulator 410 is configured to isolate the Tx signal from the Rx signal such that the Tx signal goes to the antenna 120 and an UL signal goes to the receiver 210.

The filter 420 is configured to filter out the out-of-band unwanted emissions for the transmitter 200 and the interference for the receiver 210. The circulator 410 and filter 420 are typical elements of a TDD radio communication system and as such are well-known in the art.

Figure 5:
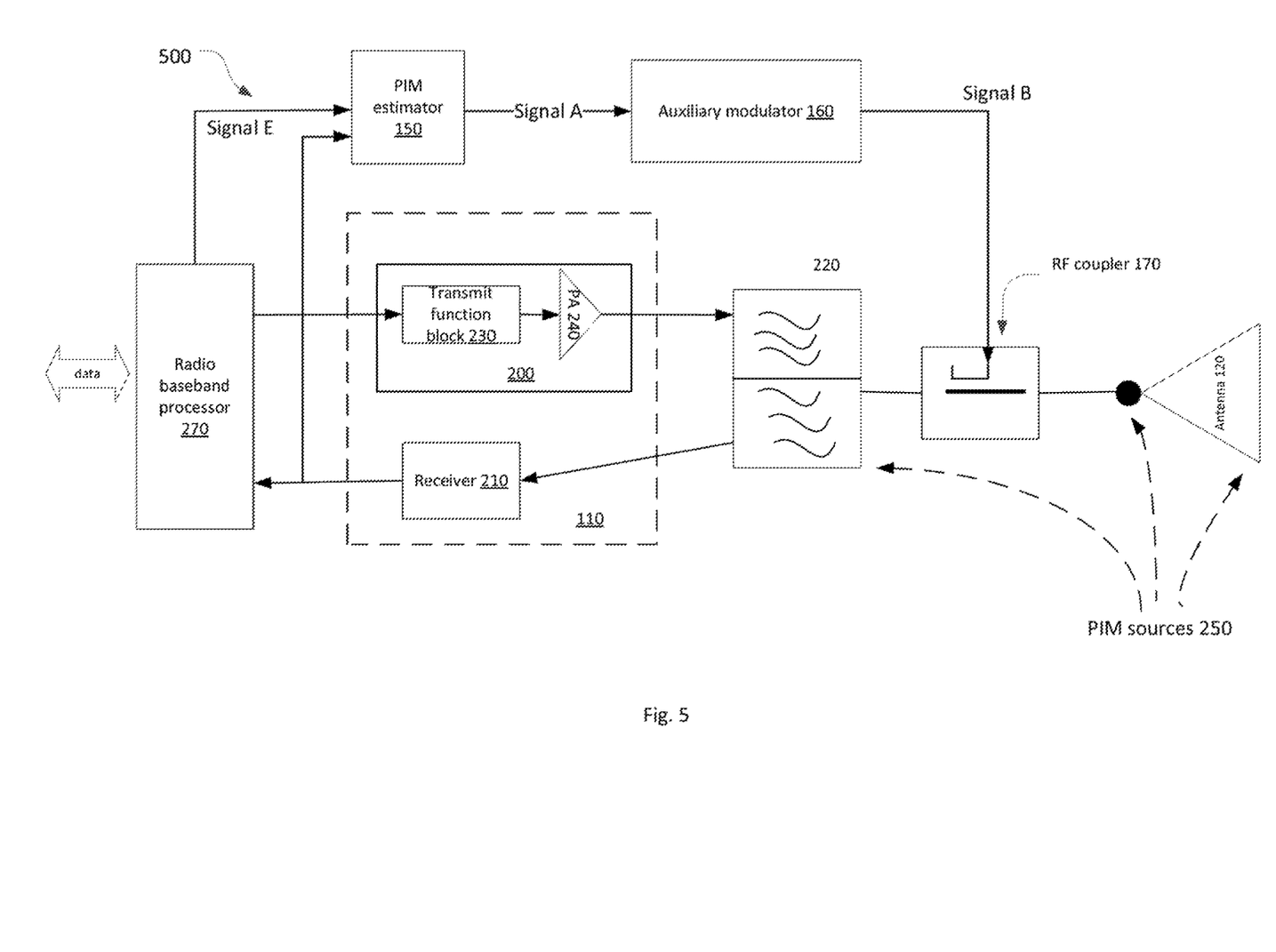
FIG. 5 illustrates a schematic diagram of a wireless communication device according to an embodiment, in a receive diversity system or Multi Input Multi Output (MIMO) system.

FIG. 5 illustrates a wireless communication device 500 in a radio communication system where the PIM products of concern are the PIM emissions that fall into other UL links of the same wireless communication device 500, i.e. the wireless communication device 500 has receive-diversity or a MIMO system.

The wireless communication device 500 is similar to the wireless communication device 100 of FIG. 3. But the wireless communication device 500 does not have the second RF coupler 180 and the auxiliary modulator 190. As such, the receiver 210 is instead used to receive a RF signal coming from the duplexer 220, whose PIM products have been already compensated through the chain that comprises the PIM estimator 150, the auxiliary modulator 160 and the first RF coupler 170. For example, the receiver 210 is configured to process the UL signal and determine the PIM products that fall in the UL frequency band. To do so, the receiver 210 has a down-converter and a baseband demodulator. The demodulator demodulates the UL signal and the residual error of the PIM estimation. As such, the receiver 210 is configured to generate a PIM error signal from the RF signal received at the receiver 210. The PIM error signal is then sent to the PIM estimator 150 for improving the PIM interference estimation.

Figure 6:
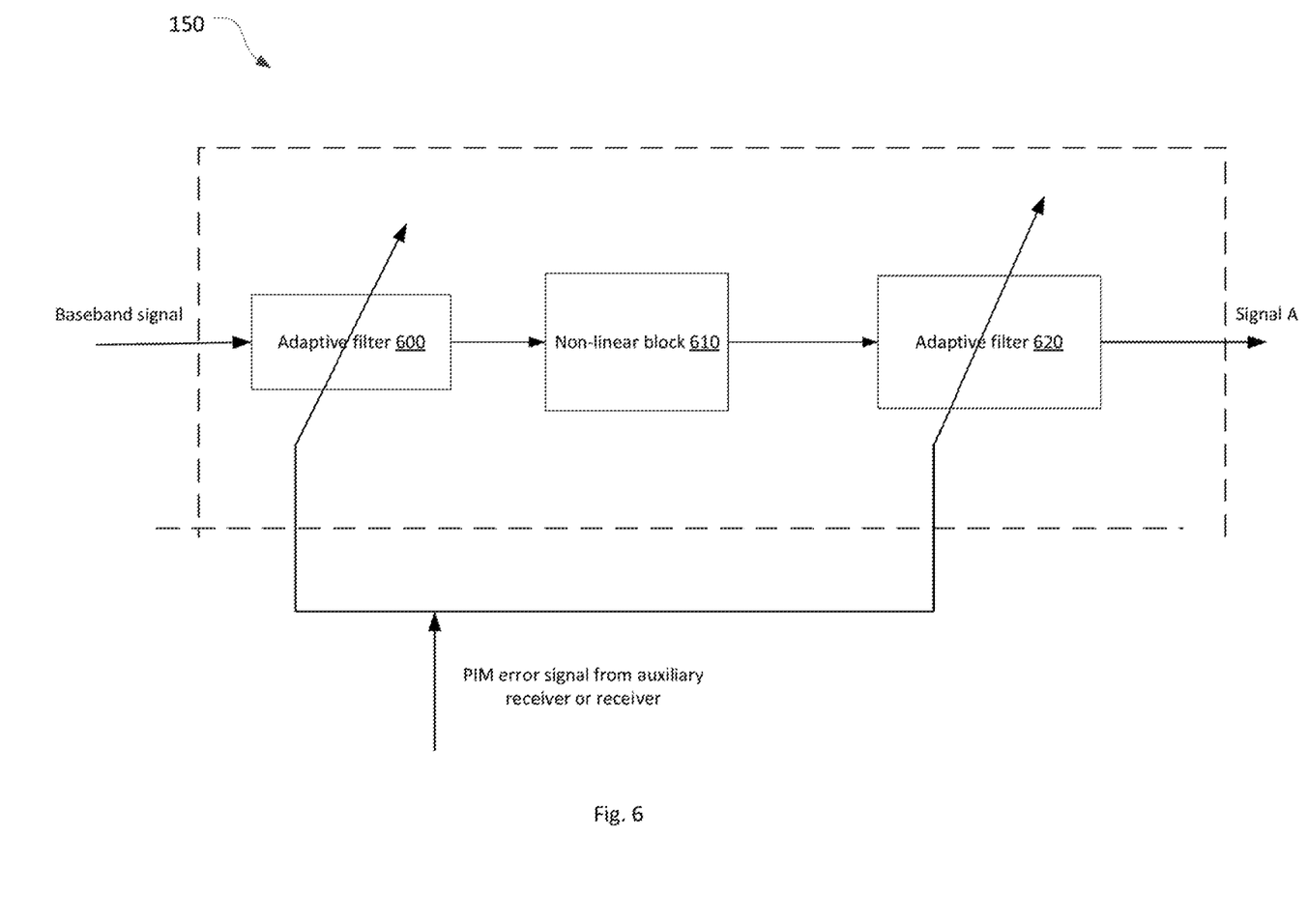
FIG. 6 illustrates a schematic diagram of a PIM estimator, according to an embodiment.

Now turning to FIG. 6, an example of an implementation of the PIM estimator 150 will be described. A number of different functions and models may be used for performing the PIM estimation. For example, a simplified Volterra model such as a Wiener model, a Hammerstein model, or a Wiener-Hammerstein model could be used. FIG. 6 shows one embodiment for the PIM estimator 150, using a simplified Volterra model, for emulating the behaviour of the PIM sources. In FIG. 6, the simplified Volterra model is a Wiener-Hammerstein model, which includes a first adaptive filter 600, a non-linear block 610 and a second adaptive filter 620.

PIM sources come from non-linear devices. A non-linear device is usually modelled with non-linear functions with memory effects. Using the Wiener-Hammerstein model, the first adaptive filter 600 is configured to model the memory effects of the PIM sources that take place before the non-linear block 610. The non-linear block 610 is configured to model the non-linearity of the PIM sources. For example, the non-linear block 610 can be a nonlinear polynomial function. The second adaptive filter 620 is configured to model the memory effects of the PIM sources that take place after the non-linear block 610.

Another embodiment for modelling the PIM sources could be the Wiener model, where only the memory effects before the non-linear block 610 is used, i.e. the first adaptive filter 600 is present but the second adaptive filter 620 is not used (or absent) in the model.

Yet another different embodiment for modelling the PIM sources could be the Hemmerstein model, where only the memory effects after the non-linear block 610 is used, i.e. the first adaptive filter 600 is not used (or absent) in the model.

It should be noted that the use of different models results in different performances of the PIM estimator 150. They may also have different complexities in the implementation.

The PIM estimator 150 uses as inputs the Tx signal and the PIM error signal.

The PIM estimate signal A is generated by the simplified Volterra model, as described above, using the Tx signal. The coefficients of the first adaptive filter 600 and second filter 620 are dynamically changed and adjusted based on the received PIM error signal D.

An adaptive filter is a linear filter whose coefficients can be adaptively changed based on a received feedback. As such, the coefficients of the adaptive filters 600 and 620 are adaptively changed based on the received PIM error signal. Furthermore, the change of the coefficients is designed with an optimization criterion, such as the Least Mean Square (LMS) criterion, or the Least Square (LS), for example. The adaptive filter using the LMS criterion results in a residual error that has the property of minimizing the mean square error. It should be noted that other components could be used as well to implement the PIM estimator 150 to perform the same functionalities.

FIG. 8 illustrates an exemplary implementation of the auxiliary modulator 160. The modulator 160 comprises a digital to analog converter (DAC) 800, a frequency converter 810, a filter 820, an amplifier 830 and a circulator 840. The DAC 800 takes as input the PIM estimate signal A and converts it to an analog signal. The DAC 800 is connected to the frequency converter 810. The frequency converter 810 receives the analog signal and converts it to a signal having the specific radio frequencies of the targeted PIM products. The frequency converter 810 is connected to the filter 820. The filter 820 receives the frequency converted signal from the frequency converter 810. The filter 820 selects the radio frequencies of the targeted PIM products and removes the unwanted radio frequency components that were introduced by the converter 810. The filter 820 is connected to the RF amplifier 830. The RF amplifier 830 receives the filtered signal from the filter 820 and adjusts the power of the filtered signal so as to provide a RF signal with the proper signal power level. The amplifier 830 is connected to the circulator 840. The circulator 840 receives the RF signal with the proper signal power level and adjusts it to a desired isolation of the signal for the output of the auxiliary modulator 160.

It should be noted that other components could be used as well to implement the auxiliary modulator 160 to perform the same functionalities FIG. 9 illustrates an example implementation of the auxiliary receiver 190. The auxiliary receiver 190 comprises a band rejection filter 900, an amplifier 910, a frequency filter 920, a filter 930, an Analog to Digital Converter (ADC) 940 and a digital filter 950.

The band rejection filter 900 is configured to remove the signal power of the Tx (downlink) band. The amplifier 910 is configured to increase the received PIM error signal power. The frequency converter 920 converts the RF signal to a lower frequency signal. The filters 930 is configured to remove the unwanted radio frequency components that were introduced by the converter 920. The filter 950 is configured to help the receiver 190 to tune the signal better to the PIM product frequencies and to remove the unwanted signals generated by the ADC 940. The filter 950 works together with the ADC 940 to convert the lower frequency signal from the analog domain to the digital domain. The ADC 940 is configured to convert the analog signal to a digital signal so that further processings of the PIM error signal can be performed in order to form the signal D.

It should be noted that other components could be used as well to implement the auxiliary receiver 190 to perform the same functionalities.

Figure 7:
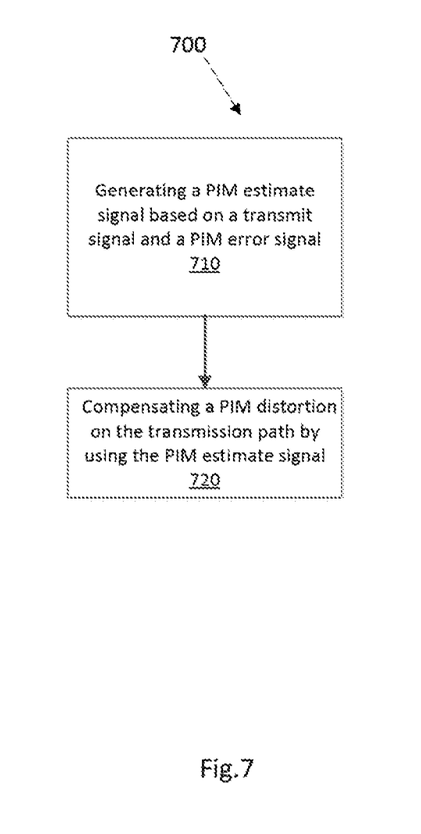
FIG. 7 illustrates a flow chart of a method for compensating PIM distortion in a wireless communication device according to an embodiment.

FIG. 7 illustrates a flow chart of a method 700 for compensating the PIM products or interference in a wireless communication device, using the compensation circuit 130, for example. The wireless communication device may be a base station, for example, and includes a transceiver, an antenna connected to the transceiver through a transmission path.

Method 700 starts with generating a PIM estimate signal based on a transmit signal and a PIM error signal (block 710). The transmit signal could be a baseband transmit signal.

Method 700 continues with compensating a PIM interference on the transmission path by using the PIM estimate signal (block 720).

In some embodiments, method 700 may further comprise modulating the PIM estimate signal to specific frequencies corresponding to the PIM interference to generate a modulated PIM estimate signal; coupling the modulated PIM estimate signal to a first RF signal from the transmission path to compensate for the PIM interference on the transmission path; coupling a second RF signal on the transmission path; and determining the PIM error signal from the coupled second RF signal.

Method 700 further comprises sending the PIM error signal to the PIM estimator for generating the PIM estimate signal. Method 700 can be used in a Frequency Division Duplex (FDD) or Time Division Duplex (TDD) radio communication system.

It should be noted that the modulated PIM estimate signal has an opposite phase but same amplitude as the PIM products of the first RF signal, thereby cancelling the PIM interference on the transmission path, when coupled with each other.

In some embodiments, method 700 further comprises modulating the PIM estimate signal to specific frequencies corresponding to the PIM products to generate a modulated PIM estimate signal; coupling the modulated PIM estimate signal to a first RF signal from the transmission path to compensate for the PIM interference on the transmission path; and determining the PIM error signal from a RF signal received at a receiver of the transceiver.

This method can be used in a radio communication system with receive diversity or Multiple Input Multiple Output (MIMO) operation.

Method 700 further comprises generating the PIM estimate signal using a Wiener-Hammerstein model, the model including a first adaptive filter connected to a non-linear block which is connected to a second adaptive filter. More specifically, the PIM estimate signal is generated based on the transmit signal and coefficients of the first and second adaptive filters, the coefficients of the first and second adaptive filters being dynamically adapted based on the PIM error signal to estimate time-varying PIM interference.

Embodiments herein thereby effectively suppress time-varying PIM interference at the transmission path of a wireless communication device. As such, not only the PIM products that fall into a specific receiver are cancelled but also those that fall into the other receive bands. The embodiments further reduce the unwanted emission level generated by the PIM and reduce interference to the other wireless communication devices. They dynamically and adaptively cancel PIM between the different wireless communication devices and varying with time and environment.

The embodiments can be used in both FDD and TDD radio communication systems. Also, they allow the wireless communication devices to tolerate components with more PIM interferences in manufacture, aging and after field installation. As such, the product yield is improved, and therefore, less field services involved with PIM issues are required.

Those skilled in the art will also appreciate that the various circuits described may refer to a combination of analog and digital circuits, including one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A wireless communication device comprising:
   a transceiver;
   an antenna connected to the transceiver through a transmission path; and
   a compensation circuit operative to compensate for a passive intermodulation (PIM) interference on the transmission path, the compensation circuit generating a PIM estimate signal based on a transmit signal and a PIM error signal, wherein the compensation circuit comprises a PIM estimator configured to generate the PIM estimate signal, the PIM estimator having as inputs the transmit signal and the PIM error signal.

2. The wireless communication device of claim 1, wherein the compensation circuit further comprises:
   a modulator connected to the PIM estimator and configured to generate a modulated PIM estimate signal by modulating the PIM estimate signal to frequencies corresponding to the PIM interference;
   a first Radio Frequency (RF) coupler, connected to the modulator and configured to compensate for the PIM interference on the transmission path by coupling the modulated PIM estimate signal to a first RF signal from the transmission path;
   a second RF coupler located on the transmission path and configured to couple a second RF signal from the transmission path; and
   a receiver connected to the second RF coupler and configured to determine the PIM error signal from the second RF signal.

3. The wireless communication device of claim 2, wherein the modulated PIM estimate signal has an opposite phase but same amplitude as the PIM interference of the first RF signal, thereby cancelling the PIM interference on the transmission path.

4. The wireless communication device of claim 2, wherein the compensation circuit is for use in a Frequency Division Duplex (FDD) or Time Division Duplex (TDD) radio communication system.

5. The wireless communication device of claim 1, wherein the transceiver comprises a transmitter and a receiver.

6. The wireless communication device of claim 5, wherein the compensation circuit comprises:
   a modulator connected to the PIM estimator and configured to generate a modulated PIM estimate signal by modulating the PIM estimate signal to frequencies corresponding to the PIM interference;
   a Radio Frequency (RF) coupler, connected to the modulator and configured to compensate for the PIM interference on the transmission path by coupling the modulated PIM estimate signal to a RF signal from the transmission path; and
   the receiver of the transceiver configured to determine the PIM error signal from a RF signal received at the receiver.

7. The wireless communication device of claim 6, wherein the compensation circuit is used in a radio communication system with receive diversity or Multiple Input Multiple Output (MIMO) operation.

8. The wireless communication device of claim 1, wherein the PIM estimator comprises a form of simplified Volterra model i.e. the Wiener-Hammerstein model, the model including a first adaptive filter connected to a non-linear block connected to a second adaptive filter.

9. The wireless communication device of claim 8, wherein the simplified Volterra model generates the PIM estimate signal based on the transmit signal and coefficients of the first and second adaptive filters.

10. The wireless communication device of claim 9, wherein the coefficients of the first and second adaptive filters are dynamically adapted based on the PIM error signal for estimating time-varying PIM interferences.

11. A method for compensating Passive InterModulation (PIM) in a wireless communication device, which includes a transceiver and an antenna connected to the transceiver through a transmission path, the method comprising:
   generating a PIM estimate signal based on a transmit signal and a PIM error signal; and compensating a PIM interference on the transmission path using the PIM estimate signal,
wherein generating the PIM estimate signal comprises using a simplified Volterra model, the model including a first adaptive filter connected to a non-linear block connected to a second adaptive filter.

12. The method of claim 11, further comprising:
modulating the PIM estimate signal to specific frequencies corresponding to the PIM interference to generate a modulated PIM estimate signal;
coupling the modulated PIM estimate signal to a first RF signal from the transmission path to compensate for the PIM interference on the transmission path;
coupling a second RF signal on the transmission path; and
determining the PIM error signal from the second RF signal.

13. The method of claim 12, wherein the modulated PIM estimate signal has an opposite phase but same amplitude as the PIM interference of the first RF signal, thereby cancelling the PIM interference on the transmission path.

14. The method of claim 12, further comprising: sending the PIM error signal to a PIM estimator for generating the PIM estimate signal.

15. The method of claim 12, wherein the method is for use in a Frequency Division Duplex (FDD) or Time Division Duplex (TDD) radio communication system.

16. The method of claim 11, further comprising:
modulating the PIM estimate signal to specific frequencies corresponding to the PIM interference to generate a modulated PIM estimate signal;
coupling the modulated PIM estimate signal to a first RF signal from the transmission path to compensate for the PIM interference on the transmission path; and
determining the PIM error signal from a RF signal received at a receiver of the transceiver.

17. The method of claim 16, wherein the method is used in a radio communication system with receive diversity or Multiple Input Multiple Output (MIMO) operation.

18. The method of claim 11, wherein generating the PIM estimate signal further comprises generating the PIM estimate signal based on the transmit signal and coefficients of the first and second adaptive filters.

19. The method of claim 18, wherein the coefficients of the first and second adaptive filters are dynamically adapted based on the PIM error signal to estimate time-varying PIM interferences.

* * * * *